US012016091B2

(12) United States Patent
Naimoli

(10) Patent No.: US 12,016,091 B2
(45) Date of Patent: Jun. 18, 2024

(54) FLEXIBLE ELECTRIC HEATER INTEGRATED IN A FABRIC AND PROCESS FOR MAKING A FLEXIBLE ELECTRIC HEATER INTEGRATED IN A FABRIC

(71) Applicant: Naimoli-Tech S.r.l., Brembate di Sopra (IT)

(72) Inventor: Mario Naimoli, Brembate di Sopra (IT)

(*) Notice: Subject to any disclaimer, the term of this patent is extended or adjusted under 35 U.S.C. 154(b) by 798 days.

(21) Appl. No.: 15/733,518

(22) PCT Filed: Feb. 28, 2019

(86) PCT No.: PCT/IB2019/051604
§ 371 (c)(1),
(2) Date: Aug. 18, 2020

(87) PCT Pub. No.: WO2019/166975
PCT Pub. Date: Sep. 6, 2019

(65) Prior Publication Data

US 2020/0389943 A1 Dec. 10, 2020

(30) Foreign Application Priority Data

Feb. 28, 2018 (WO) .................. PCT/IT2018/000027

(51) Int. Cl.
*H05B 3/34* (2006.01)
*D03D 11/02* (2006.01)
(Continued)

(52) U.S. Cl.
CPC ............. *H05B 3/347* (2013.01); *D03D 11/02* (2013.01); *D03D 15/00* (2013.01); *D03D 15/25* (2021.01);
(Continued)

(58) Field of Classification Search
CPC .......... H05B 3/347; H05B 3/12; H05B 3/145; H05B 3/34; H05B 3/342; H05B 3/345;
(Continued)

(56) References Cited

U.S. PATENT DOCUMENTS 2,379,580 A * 7/1945 Hendley ................ H05B 3/342
219/545
4,538,054 A * 8/1985 de la Bretoniere ...... D02G 3/12
392/432

(Continued)

FOREIGN PATENT DOCUMENTS

DE 202006017491 3/2007
FR 2922405 4/2009

(Continued)

*Primary Examiner* — Shawntina T Fuqua
(74) *Attorney, Agent, or Firm* — Themis Law

(57) ABSTRACT

A flexible electric heater integrated in a fabric has a surface extending substantially in a two-dimensional plane and including at least one heating strip approximately parallel to the fill threads, electrically connected to strips of electrically conducting wires arranged approximately parallel to the warp threads, next to different portions of the fabric. The at least one heating strip includes a plurality of electrically heating fill threads intertwined with the fabric and each strip of electric conducting wires includes a plurality of electrically conducting warp threads intertwined with the fabric, the plurality of electrically heating weft threads being intertwined with the plurality of electrically conducting warp threads. A process is described of making a flexible electric heater integrated in a fabric.

13 Claims, 6 Drawing Sheets

(51) Int. Cl.

| | |
|---|---|
| ***D03D 15/00*** | (2021.01) |
| ***D03D 15/25*** | (2021.01) |
| ***D03D 15/283*** | (2021.01) |
| ***H05B 1/02*** | (2006.01) |
| ***H05B 3/12*** | (2006.01) |
| ***H05B 3/14*** | (2006.01) |

(52) U.S. Cl.
CPC ......... *D03D 15/283* (2021.01); *H05B 1/0272* (2013.01); *H05B 3/12* (2013.01); *H05B 3/145* (2013.01); *D10B 2331/04* (2013.01); *H05B 2203/002* (2013.01); *H05B 2203/011* (2013.01); *H05B 2203/016* (2013.01)

(58) Field of Classification Search
CPC ............ H05B 1/0272; H05B 2203/002; H05B 2203/011; H05B 2203/016; H05B 2203/005; H05B 2203/007; H05B 2203/015; H05B 2203/017; H05B 2203/036; D03D 11/02; D03D 15/00; D03D 15/25; D03D 15/283; D10B 2331/04
See application file for complete search history.

(56) References Cited

U.S. PATENT DOCUMENTS

2006/0228970 A1* 10/2006 Orr .......................... D04H 3/05 442/329
2008/0135120 A1* 6/2008 Seo ........................ H05B 3/347 139/420 R
2013/0186054 A1* 7/2013 Dua ....................... D03D 47/38 57/23
2017/0198424 A1* 7/2017 Alex ......................... D03J 1/04

FOREIGN PATENT DOCUMENTS

KR 20210046529 A * 4/2021
WO 2009075676 6/2009
WO WO-2009075676 A2 * 6/2009 ............ H05B 3/347

* cited by examiner

FLEXIBLE ELECTRIC HEATER INTEGRATED IN A FABRIC AND PROCESS FOR MAKING A FLEXIBLE ELECTRIC HEATER INTEGRATED IN A FABRIC

The present invention refers to a flexible electric heater integrated in a fabric and to a process for making a flexible electric heater integrated in a fabric.

In general, the present invention refers to a heater comprising heating elements intertwined with a fabric, with a surface extending substantially in a two-dimensional plane, for example a flexible heating plate or a net-type heater used in the textile field.

In particular, the present invention refers to heaters which use a particular layout for the resistive material or the resistive elements, with multiple resistive elements or mutually insulated resistive areas.

The prior art is given by patent EP-B1-1835786 dealing with a surface heating element supported by a fabric of intertwined weft and warp threads comprising at least two heating strips, each heating strip composed of a group of electrically conducting threads mutually spaced and electrically connected to a starting portion and an end portion through connecting means composed of thin plane sheets arranged spaced along a ribbon on the fabric and electrically connected to the electrically conducting threads. The distance between the adjacent electrically conducting threads and the heating strips is changed to affect the heating effect. The electrically conducting threads are designed as copper wires. The connecting means are connected to the heating strips through welding and are designed as a flexible printed circuit. The use of thin conducting threads allows obtaining a very flexible surface.

EP-B1-1835786 solves the problem of over-heating and the consequent melting of thin conducting threads due to the high resistance, both with high and with low voltage, by means of a plurality of thin conducting threads connected in parallel with a heating ribbon. In this way, the absolute resistance of the surface heating element decreases with respect the one of individual conductors. Both the lower absolute resistance and the lower produced heat allow largely doing without the danger of melting the conductors.

Moreover, the prior art is given by patent IT-B-0001263333 dealing with an electrically conducting fabric comprising areas of non-conductive yarn intercalated with areas of yarn with metallic or carbon conductive fibers connected in series and/or in parallel through interconnections supplied with low-voltage electric current.

IT-B-0001263333 solves the problem of making an electrically conducting fabric by suitably interweaving with conductive and non-conductive yarns, in a sort of weft/warp, to allow reaching the steady state temperature without the need of using pressure welding techniques when there is heat to join the conductive threads.

Moreover, the prior art is given by patent IT-B-0001397028, dealing with a process to obtain a heating fabric comprising a step of placing many different carbon threads arranged mutually parallel, followed by placing on the fabric at least one layer of glue of the re-activating type at a pre-set temperature; therefore, bending is provided on the fabric followed by placing a first layer of threads of nickel-coated carbon and a second layer of threads made of tin-coated copper, before re-bending and hot pressing the longitudinal edges of the fabric.

Starting from this state of the art, a need is felt of further improving the operation of heating fabrics for an industrial use, above all the one dealing with producing thermal blankets.

A first problem is given by the need of removing the assembling steps which provide for gluing/welding the heating element on a matrix of non-conductive fabric.

A further problem is given by the need of simplifying the building and operating architecture of a thermal blanket in compliance with the standards in force.

Object of the present invention is solving the above prior art problems by providing a flexible electric heater integrated in a fabric lacking welded ribbons.

A further object is providing a flexible electric heater integrated in a fabric equipped with non-conductive yarns, for example, polyester, cotton or any other natural, artificial or synthetic, textile fiber, intertwined with conductive yarns of a different nature, like tin-coated copper, silver-coated copper, red copper, silver, nickel, stainless steel, conductor coated with a fabric, tinsel, conductors or semi-electric conductors for electric supply and filaments made of carbon fibers for heating the fabric.

A further object is providing a flexible electric heater integrated in a fabric designed for observing the standards dealing with electric safety of blankets, heating pads, clothing and other flexible heating electric devices for domestic use and the like, for heating a bed and a human body.

A further object is making a flexible electric heater integrated in a fabric through weaving only, wherein non-conductive yarns of the fabric are the carrier structure.

The above and other objects and advantages of the invention, as will appear from the following description, are obtained with a flexible electric heater integrated in a fabric as claimed in claim 1.

Moreover, the above and other objects and advantages of the invention, as will result from the following description, are obtained with a process for making a flexible electric heater integrated in a fabric as claimed in claim 11.

Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention as appears from the enclosed claims.

The present invention will be better described by some preferred embodiments thereof, provided as a non-limiting example, with reference to the enclosed drawings, in which.

Figure 1:
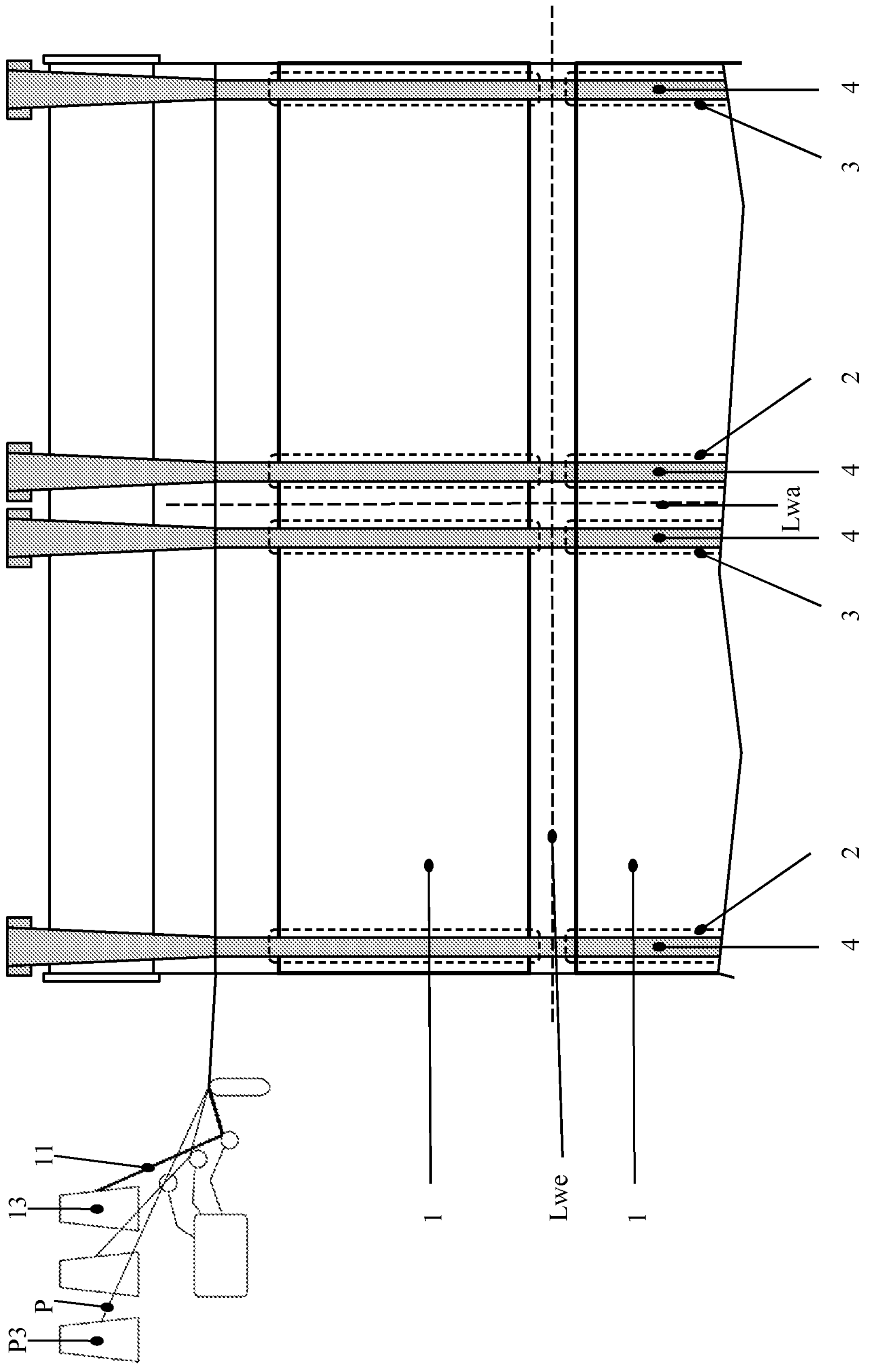
FIG. 1 shows a schematic view of a first embodiment of a flexible electric heater integrated in a fabric according to the present invention.

With reference to FIG. 1, it is possible to note that a flexible electric heater integrated in a fabric, with a surface extending substantially in a two-dimensional plane, comprises at least one heating strip 1 approximately parallel to the weft threads and electrically connected to strips of electric conducting wires 4 arranged approximately parallel to the warp threads, next to different portions of fabric 2, 3.

Figure 2:
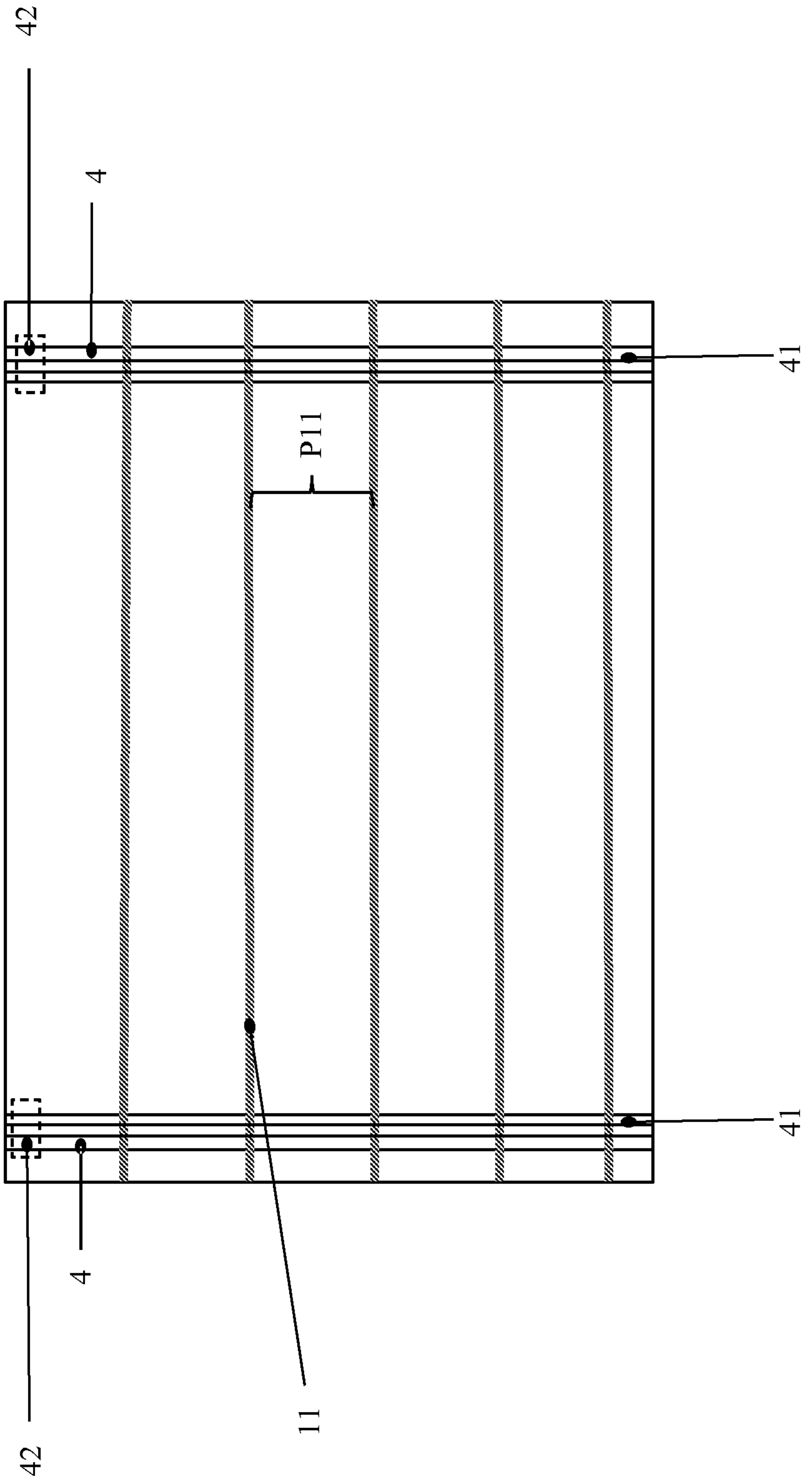
FIG. 2 shows a schematic detailed view of the previous Figure.

Advantageously, with reference to FIG. 2, such at least one heating strip 1 is composed of a plurality of electrically heating weft threads 11 intertwined with the fabric.

Moreover, each strip of electric conducting wires 4 is composed of a plurality of electrically conducting warp threads 41 intertwined with the fabric.

In particular, the plurality of electrically heating weft threads 11 is intertwined with the plurality of electrically conducting warp threads 41.

Figure 3:
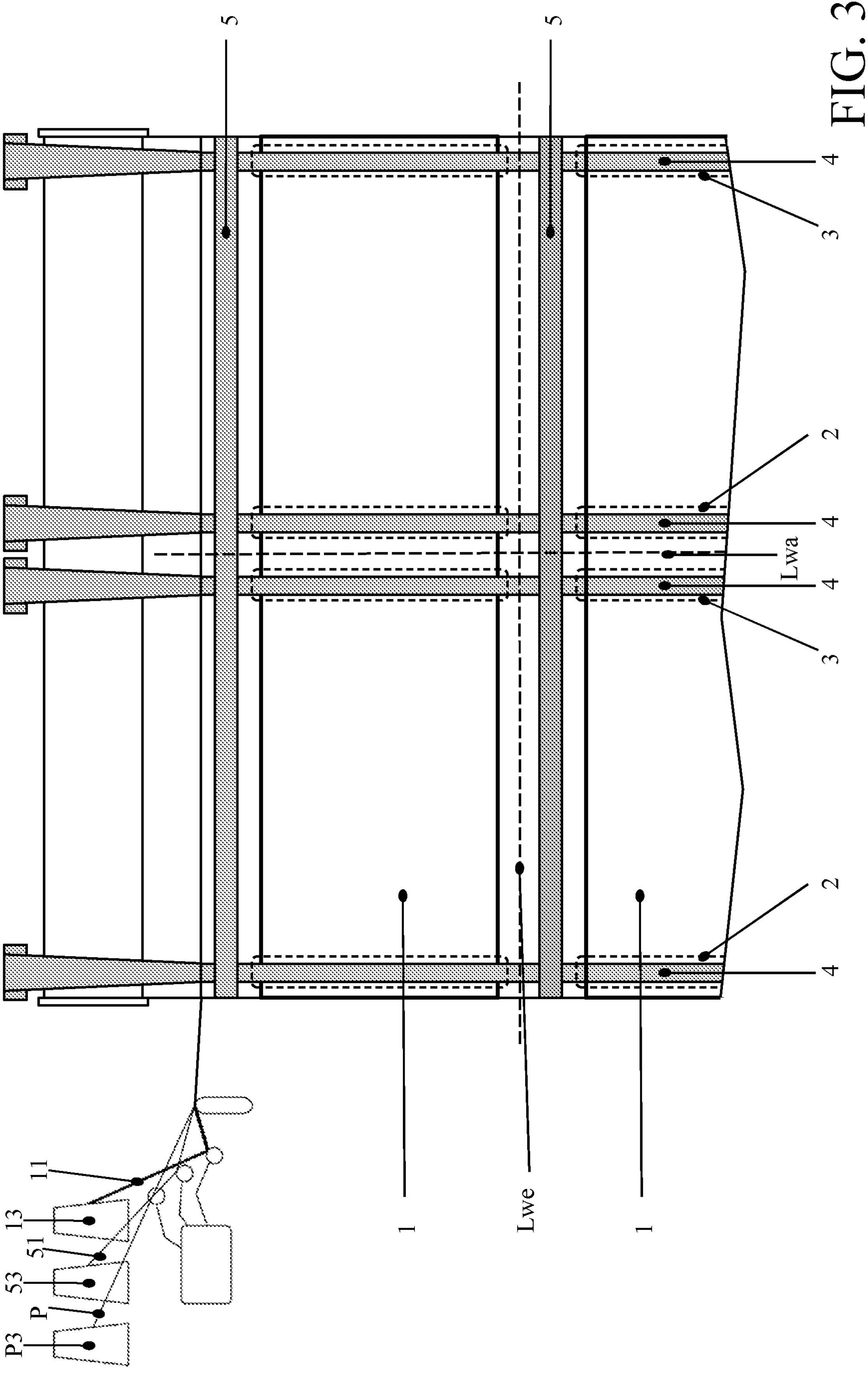
FIG. 3 shows a schematic view of a second embodiment of a flexible electric heater integrated in a fabric according to the present invention.
Figure 4:
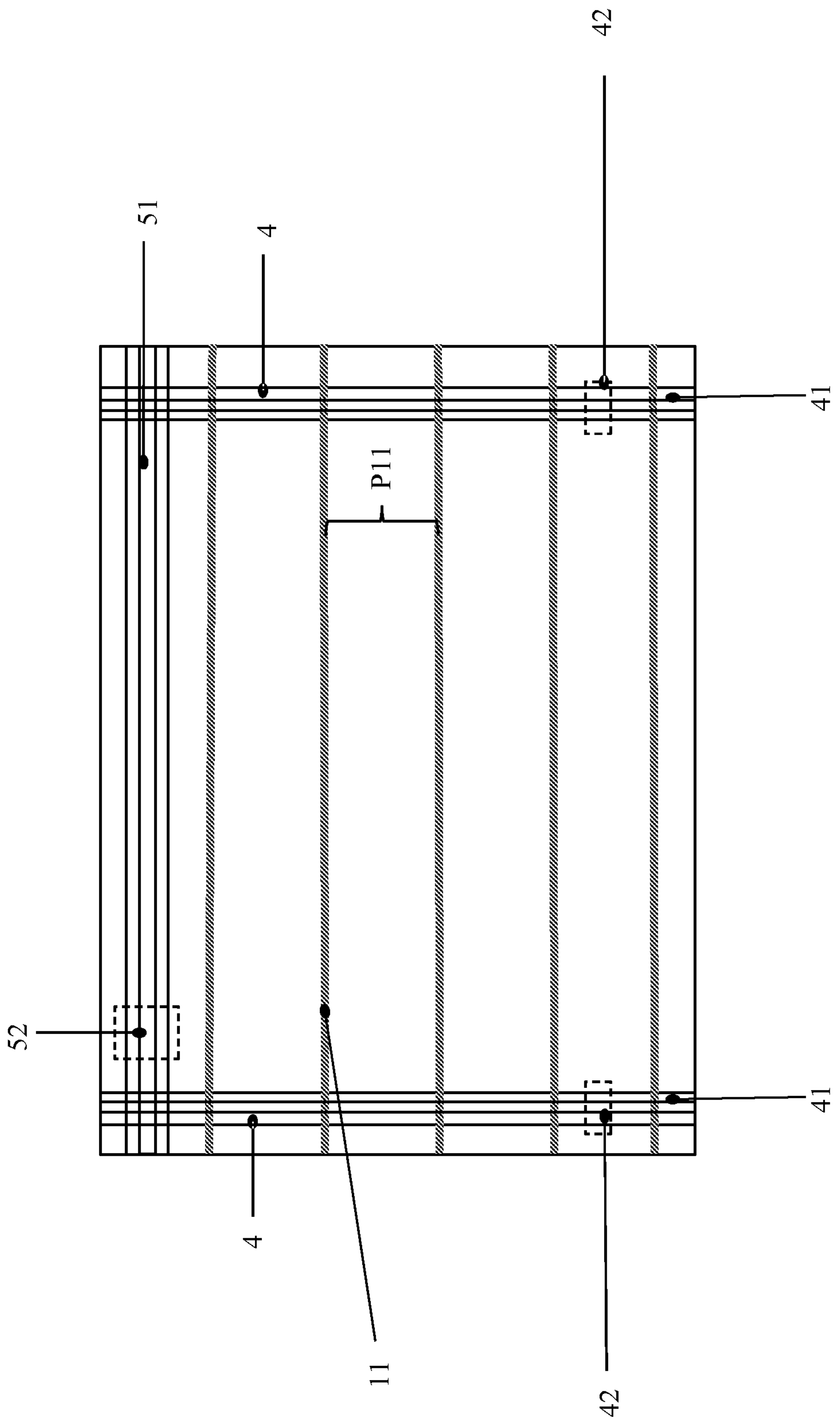
FIG. 4 shows a schematic detailed view of the previous Figure.
Figure 5:
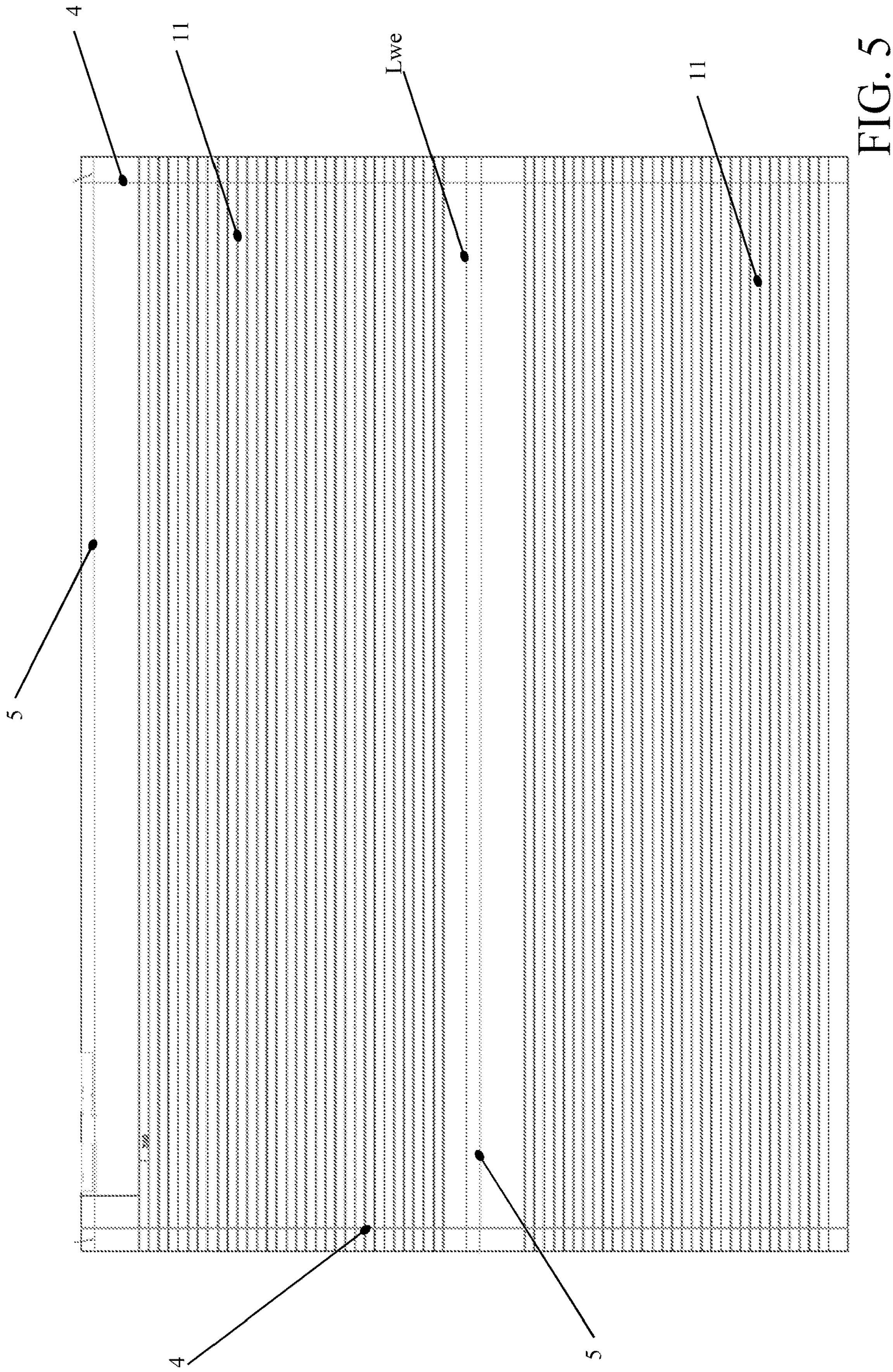
FIG. 5 shows an example embodiment of the flexible electric heater integrated in a fabric of FIGS. 1, 2.
Figure 6:
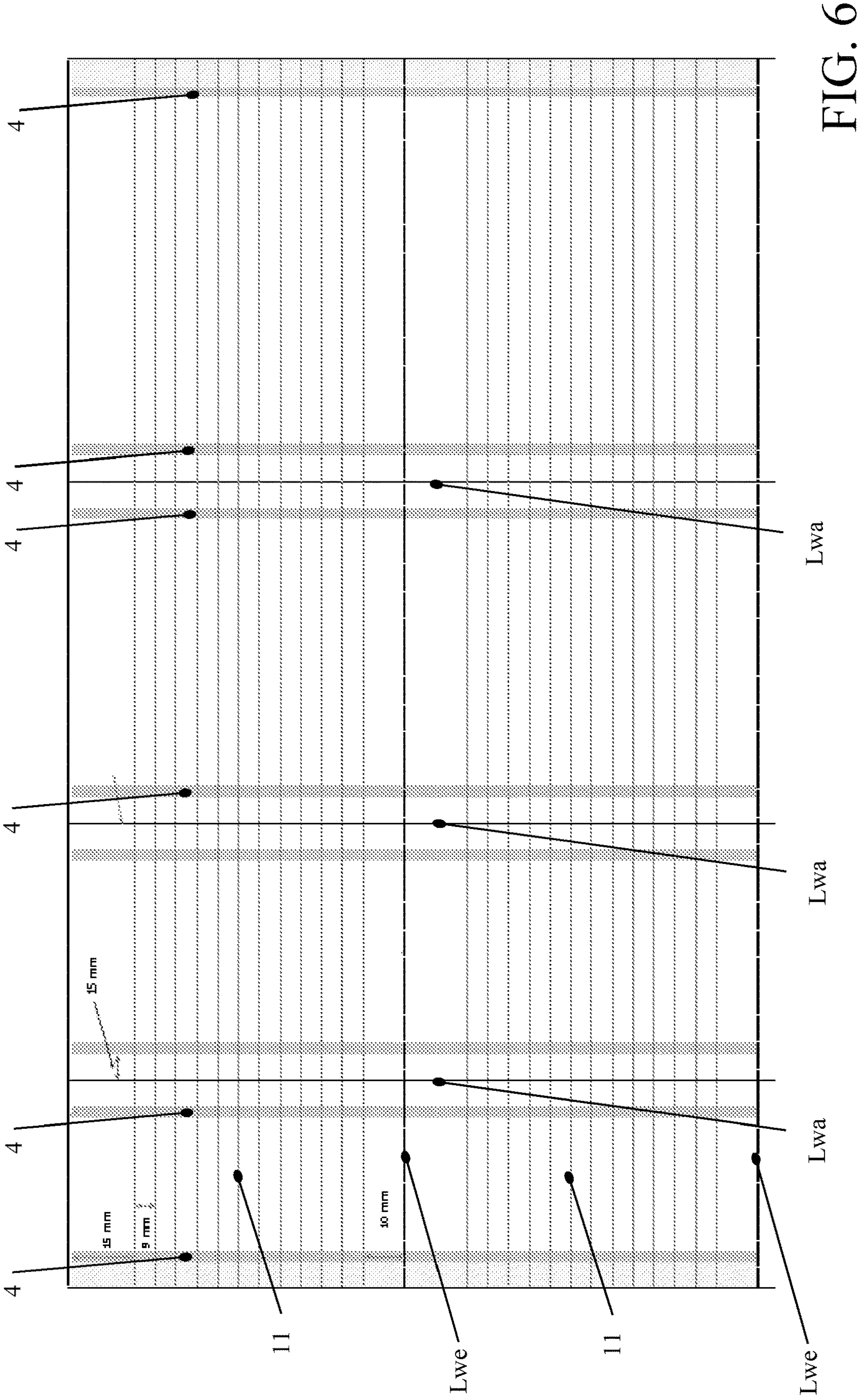
FIG. 6 shows an example embodiment of the flexible electric heater integrated in a fabric of FIGS. 3, 4.

With reference to FIGS. 3, 4, according to a variation of the flexible electric heater integrated in a fabric, a strip of further electric conducting wires 5 approximately parallel with respect to the weft threads is composed of a plurality of electrically conducting weft threads 51 intertwined with the fabric and with the plurality of electrically conducting warp threads 41 to allow mutually connecting the strips of electric conductors 4.

The electrically heating weft threads 11 are mutually spaced by a pitch P11, approximately included between 4 mm and 45 mm, according to design specifications.

Defining exactly the pitch between two adjacent heating weft threads, provides for allowing to determine exactly the power which is needed for obtaining a uniform and constant heating and furthermore allows to respect the temperatures which are set by the current regulations regarding safety of the products.

Each of the electrically conducting warp threads 41 and of the electrically conducting weft threads 51 is composed of strands; the formation of strands can be included from a minimum of 2 to a maximum of 46 capillaries, the section of these latter ones being included between 0.03 mm and 2 mm, according to design specifications.

An example of formation of a strand can be 20×0.05 mm.

The amount of the electrically conducting warp threads 41 of each electrically conducting ribbon 4, as well as the amount of the electrically conducting weft threads 51 of each strip of further electric conductors 5 depend on design specification.

According to a preferred configuration, each electrically conducting ribbon 4 is formed of a number included between 3 and 48 electrically conducting warp threads 41. In the same way, each strip of further electric conductors 5 is formed of a number included between 3 and 48 electrically conducting weft threads 51.

The electrically heating weft thread 11 is of a carbon-based material, while the electrically conducting warp thread (41) and electrically conducting weft thread (51) is of at least one material between thin copper, tin-coated copper, silver-coated copper, red copper, silver, nickel, stainless steel, conductor coated with a fabric, tinsel.

With reference to FIG. 2, the flexible electric heater integrated in a fabric can comprise at least one connector for the electric wiring, fastened onto the surface of the fabric to be able to supply the strips of electric conductors 4 next to at least one conducting portion of warp 42.

With reference to FIG. 4, the flexible electric heater integrated in a fabric can comprise at least one connector for the electric wiring fastened onto the surface of the fabric to be able to supply the strips of electric conducting wires 4 and the strip of further electric conducting wires 5, next to at least one conducting portion of warp 42 and of weft 52.

Such at least one electric connector is composed of a receptacle adapted to house supply wires, pressure junction means, by crimping or through welding of the warp threads and/or of weft electrically conducting 41, 51. Preferably, the electric connector is connected to a cable of an electric source, in direct or alternate current, to supply the electric heater with a low voltage, included between 2 and 48 volt.

A process for making a flexible electric heater integrated in a fabric comprises a step of weaving through a loom, depending on shape and transverse sizes of the thread of weft supplied by at least one creel 13, 53, respectively of the electrically heating weft thread 11 and of the electrically conducting weft thread 51, in combination with a yarn P of the fabric.

Moreover, the process for making a flexible electric heater integrated in a fabric comprises a step of cutting the surface of fabric according to preset lines along the weft Lwe and along the warp Lwa, to allow obtaining a plurality of portions of fabric, each electrically independent.

The flexible electric heater integrated in a fabric of the present invention mainly lends itself for making blankets, heating pads, clothing and other flexible heating electric devices for household use and the like, for heating a bed or a human body, comprising arrays of electrically heating weft threads of a carbon-based material.

The carbon-based material allows exploiting the intrinsic features of flexibility and ductility, to efficiently link and twist weft and warp, optimizing the low-resistance thermal bridge, in the necessary intertwining to guarantee the electric connection between the heating weft threads made of carbon fiber and the conducting warp threads made of thin copper.

A further advantage in the use of carbon fibers is being able to exploit features such as: resistance to oxidation and humidity; absence of thermal inertia and thermal dilatations; high capability of storing and diffusing heat; resistance to oxidation; durability in time; structural flexibility; efficient heating transient to allow quickly reaching the steady state temperature.

Normally, such electrically heating weft threads are carbon yarns 1K, 3K, 6K, 12K, whose roving or yarn is composed of 1000, 3000, 6000, 12000 filaments.

Each electrically heating weft thread made of carbon fiber is unwound from a respective creel and inserted through the warp of the fabric through the same inserting means of the weft, for example a pliers, of the multi-weft loom. In so making, a contact is ensured for the conducting warp threads intertwined with respect to the weft thread made of carbon fibers, without the risk of etching or cutting the carbon fibers. At the same time, the thereby obtained intersection between the conducting threads and the carbon yarns ensures the electric connection through an adequate abutment action of the loom. On the sides of each conducting band, a warp density is obtained with a higher value, to stabilize and guarantee a good connection and a good conductibility under different use situations. Furthermore, the said higher density of the wrap allows to avoid the generation of so-called hot spots, i.e. spots in which the temperature is higher than in the surrounding area.

A further parameter to be taken into account to comply with steady state thermal conditions is given by the mutual distance of the copper threads, both of weft and of warp, and of the heating threads made of carbon fibers.

According to a preferred configuration, a flexible electric heater integrated in a fabric is obtained through weaving through a beam of polyester yarn or other textile fiber whose height ranges from 1200 mm to 3200 mm, cloth rollers of yarn of conducting warp whose number ranges from 2 to 28, suitably arranged depending on design specifications.

The final cut of the patch ensures the electric continuity and the electric supply is ensured through electric wiring and a connector fastened to the fabric and connected to the copper threads.

According to a further embodiment the flexible electric heater may be combined with one or more other layers of fabrics.

The said flexible electric heater may be realized according to one or more of the preceding combinations or embodiments.

The said flexible electric heater is provided as an intermediate layer sandwiched in between of two or more outer layers.

According to a further embodiment the flexible heating element is provided of two layers which are generated and interlinked during the same weaving process.

Particularly the said flexible heating element comprises a three-dimensional fabric comprising two fabric layers which are interconnected by transverse threads, the two layers forming a chamber between them.

In a variant embodiment the electric conductive threads and the heating threads, i.e. the electric conductive yarn or fibers and/or the electric heating yarn or fibers are simply housed inside the two layers forming the three-dimensional fabric, the transverse yarn providing for keeping in position the heating threads avoiding short-circuits due to two heating threads coming into contact.

In a further variant embodiment, the said the electric conductive threads and the heating threads, i.e. the electric conductive yarn or fibers and/or the electric heating yarn or fibers are intertwined with the two layers and the transverse yarn of the three-dimensional fabric in a similar way as in the embodiments of FIGS. 1 to 6.

The last embodiments allows to produce in a one step weaving process heating pads or covers which currently needs to laminate or fix a flexible heating blanket to other fabric layers such as a sandwiched pad or similar.

In the case of the said last embodiment the pad or the heating cover is produced during the weaving of the three-dimensional fabric.

According to an embodiment the said three-dimensional fabric is obtained by using a jacquard weaving apparatus.

According to still a further embodiment which can be provided in combination with any of the above disclosed embodiments or variants, the heating thread is protected by means of a sort of housing tube extending parallel to the extension of the heating thread and generating a housing chamber for the said heating thread.

According to an embodiment of the above general embodiment, the housing chambers are obtained by separating for a certain time of the fabric.

Due to this technology tubes are generated within the thickness of the fabric, the tubes having about 2 mm of diameter.

In detail the method provides for the following steps:

generating of two layers during weaving;

inserting the heating yarn inside the said two layers in a chamber provided exclusively for one or a group of heating threads.

In order to produce such kind of fabrics, there is the need of dividing the wrap in two equal parts and doubling the number of the weft pro cm in order to produce two new layers which provides for housing chambers for the heating threads. Each housing chambers isolates the heating and/or electric conducing threads from the environment and from the other yarns avoiding thus short circuits due to thiolation of the heating or conducting thread.

The final result consists in the fact that the heating threads is secured inside the housing chamber which is formed automatically during the weaving phase and at the same time strengthening the fabric against mechanical stresses.

The effect obtained is the one of protecting the heating threads made of carbon in the housing tunnels.

According to man example the structure of the fabric is composed of 64 threads of the warp and of 16.5 weft for each cm. At the housing tunnels the two layers of fabric are formed each one of 32 threads and of 16.5 weft.

The invention claimed is:

1. A flexible electric heater integrated in a fabric, with a surface extending in a two-dimensional plane, comprising:

at least one heating strip (1) parallel to fill threads, said at least one heating strip (1) being electrically connected to strips of electrically conducting wires (4), said strips of electrically conducting wires (4) arranged approximately parallel to warp threads, next to different portions of fabric (2), (3), wherein said at least one heating strip (1) comprises a plurality of electrically heating fill threads (11) intertwined with the fabric, each strip of electric conducting wires (4) comprising a plurality of electrically conducting warp threads (41) intertwined with the fabric, said plurality of electrically heating fill threads (11) being intertwined with said plurality of electrically conducting warp threads (41), wherein the strips of electrically conducting wires (4) form conducting bands, and wherein a warp density has a higher value than in a remainder of the flexible heater on a side of each conducting band and at a crossing of the conducting bands and the heating fill threads (11), wherein each of said electrically conducting warp threads (41) and of said electrically conducting fill threads (51) comprises strands in an amount included between a minimum of 2 and a maximum of 46 capillaries, sections of the capillaries being included between 0.03 mm and 2 mm, and wherein an amount of the electrically conducting warp threads (41) of each strip of electrically conducting wires (4) is between 3 and 48 threads.

2. The flexible electric heater integrated in a fabric according to claim 1, further comprising at least one strip of additional electrically conducting wires (5) parallel with respect to the fill threads, said at least one strip of additional electrically conducting wires (5) comprising a plurality of electrically conducting fill threads (51) intertwined with the fabric and with said plurality of electrically conducting warp threads (41) to allow mutually connecting said strips of electrically conducting wires (4).

3. The flexible electric heater integrated in a fabric according to claim 1, wherein the electrically heating fill threads (11) are mutually spaced by a pitch (P11) between 4 mm and 45 mm.

4. The flexible electric heater integrated in a fabric according to claim 2, wherein an amount of the electrically conducting fill threads (51) of each strip of additional electrically conducting wires (5) is between 3 and 48 threads.

5. The flexible electric heater integrated in a fabric according claim 2, wherein the electrically heating fill threads (11) are of a carbon-based material, while the electrically conducting warp threads (41) and the plurality of electrically conducting fill threads (51) are of at least one material selected from the group consisting of copper, tin-coated copper, silver-coated copper, red copper, silver, nickel, stainless steel, conductors coated with a fabric, and tinsel.

6. The flexible electric heater integrated in a fabric according to claim 1, further comprising at least one electric connector fastened onto the surface of the fabric so as to connect and supply said strips of electrically conducting wires (4) next to at least one conducting portion of warp (42).

7. The flexible electric heater integrated in a fabric according to claim 2, further comprising at least one electric connector fastened onto the surface of the fabric so as to connect and supply said strips of electrically conducting wires (4) and said strip of additional electric conducting wires (5), next to at least one conducting portion of warp (42), of fill (52).

8. The flexible electric heater integrated in a fabric according to claim 7, wherein the electric connector comprises a receptacle adapted to house supply wires, pressure junctions, with crimping or through welding, of said warp threads and/or of said fill threads (41), (51), the electric connector being connected to a cable of an electric source, under direct or alternate current, to supply the flexible electric heater with a voltage between 2 and 48 volt.

9. A process of making a flexible electric heater integrated in a fabric according to claim 2, comprising:

weaving in a loom, depending on shape and transverse sizes of the fill threads supplied by at least one creel (13, 53,), said electrically heating fill threads (11), said electrically conducting plurality of fill threads (51), in combination with a yarn (P) of the fabric, wherein the weaving comprises weaving at least one heating strip (1) parallel to the fill threads into the fabric, the least one heating strip (1) being electrically connected to the strips of the electrically conducting wires (4), the strips of electrically conducting wires (4) forming conducting bands, the warp density having a higher value than in the remainder of the flexible heater on the side of each conducting band and at the crossing of the conducting bands and the heating fill threads (11).

10. The process of making a flexible electric heater integrated in a fabric according to claim 9, further comprising:

cutting the surface of the fabric according to preset lines along the fill (Lwe) and along the warp (Lwa) to obtain a plurality of portions of the fabric, each electrically independent.

11. The flexible electric heater according to claim 1, wherein the fabric is-comprises longitudinal chambers extending in fill direction, each chamber housing a heating fill thread.

12. The flexible electric heater according to claim 1, wherein the fabric is a three dimensional fabric, the electrically heating fill threads (11) being intertwined with one of a plurality of layers of the fabric, each strip of the electrically conducting wires (4) being composed of a plurality of electrically conducting fill threads (41) intertwined with the said one or more of the plurality of layer of the fabric, said electrically heating fill threads (11) being intertwined with said plurality of electrically conducting fill threads (41).

13. The flexible electric heater according to claim 1, wherein the fabric woven with polyester yarn or other textile fiber having a height ranging from 1200 mm to 3200 mm.

* * * * *